Patented Feb. 15, 1938

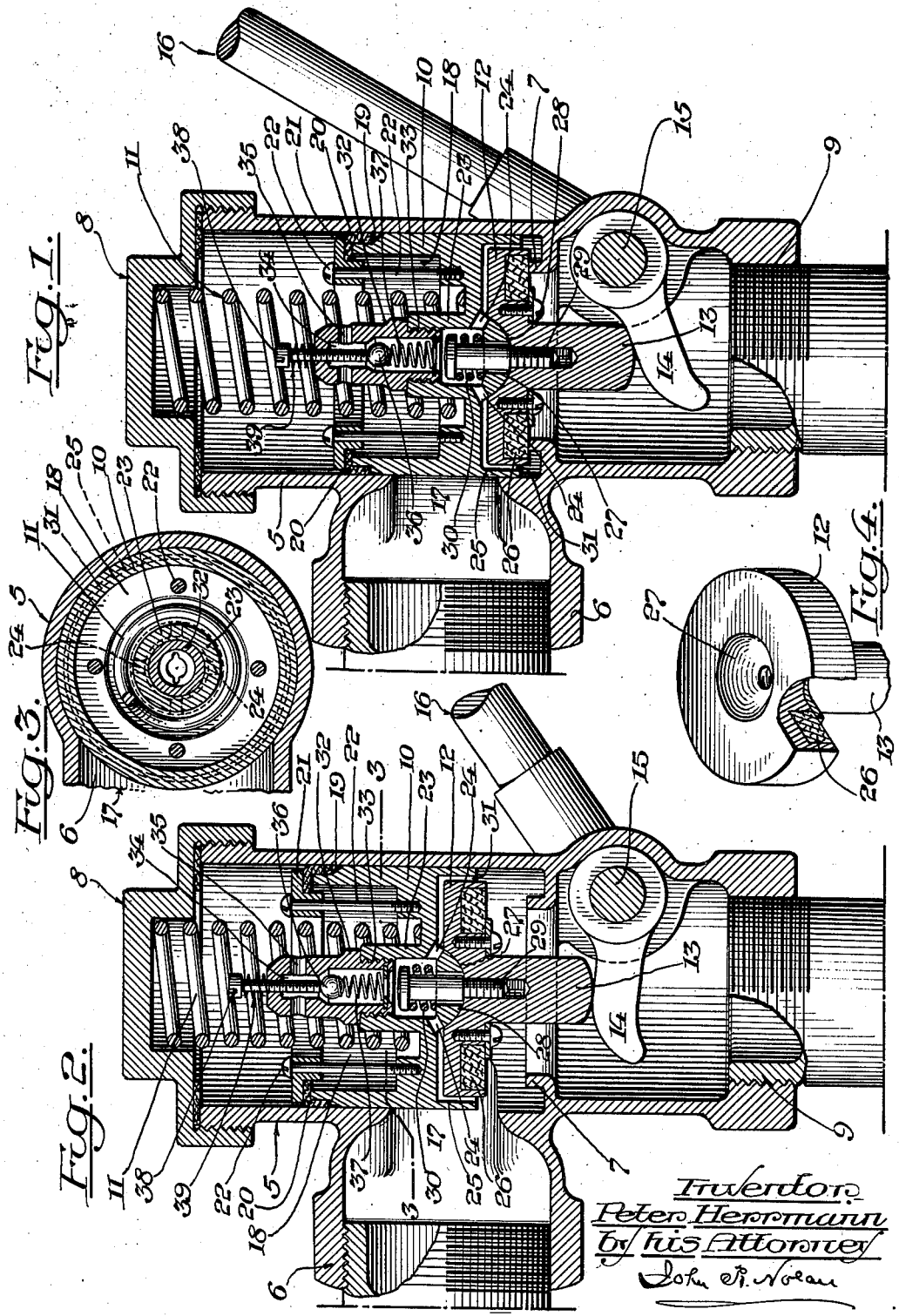

2,108,534

UNITED STATES PATENT OFFICE 2,108,534

SELF-CLOSING VALVE

Peter Herrmann, East Orange, N. J.

Application March 26, 1937, Serial No. 133,103

7 Claims. (Cl. 251—138)

This invention relates to a self-closing valve of the spring actuated piston type for use in connection with pipe lines for fluid under pressure, such, for example, as in systems whereby gasoline is pumped to large distributing tanks or tank cars.

The object of my invention is to improve such valve in various particulars hereinafter pointed out whereby the practical operation of the valve is more effective and reliable and whereby excessive "hammer" action in the pipe line to which the valve is connected is overcome during the closing of the valve.

In accordance with my invention a valve construction is provided whereby when the piston valve is raised against the action of the spring to open the communication between the supply and discharge pipes, the building up of fluid pressure within the chamber above the valve is prevented, thus, upon the release of the valve to check the flow to the discharge pipe, limiting the downward or closing force on the valve to the action of the spring until the valve nears its seat, which seat is located below the inlet port. Thereupon the fluid under pressure flows through and above the valve in a manner to counteract the pressure on the lower end of the valve, thus permitting the final seating of the valve by the spring. In the closing movement of the piston valve the pressure in the pipe line to which the pump is connected is sufficiently checked to slow down the pump and prevent the building up of an excessive pressure in the line, thus preventing the hammering action previously referred to.

The invention also comprises novel features of construction and combinations of parts which will be hereinafter described; the scope of the invention being expressed in the appended claims.

In the drawing—

Figure 1 is a vertical section of a valve structure embodying the preferred form of my invention, the piston valve being represented in closing and sealing position.

Fig. 2 is a similar view showing the valve as partially open.

Fig. 3 is a partial horizontal section through the piston valve and its casing, as on the line 3—3 of Fig. 2.

Fig. 4 is a sectional perspective view of the gasket supporting disc removed from the bottom of the piston valve.

Referring to the drawing, 5 is a cylindrical casing having a lateral inlet 6, an annular valve seat 7 located in a plane below the inlet, a cap 8 at the upper end of the casing, and a threaded portion 9 at the lower end for the usual discharge pipe. In practice the inlet 6 is connected to one end of a supply pipe in communication with a suitable pump as usual. Within the casing 5 is a piston valve 10 reciprocative relatively to the inlet and the valve seat in order to open or close the communication between the inlet and the discharge portion of the casing, as desired. The piston valve is normally urged toward its seat by means of a stout spring 11 which is interposed between the valve and the cap. The bottom of the valve has a tiltable sealing disc 12 of novel construction (hereinafter described) provided with a depending central stud 13 which bears upon a cam arm 14 fast on a transverse rock shaft 15 journaled in bearings in the walls of the casing. One end of the shaft projects through and beyond the adjacent side of the casing, and is equipped with a lever 16 by actuation of which when the valve is seated the shaft and its arm 14 can be partially turned to raise the disc 12 and lift the piston valve, thus opening the inlet port. Thereafter upon the release of the lever the recoil of the spring returns the valve to closing position and the supply of fluid, under pressure, to the discharge pipe is cut-off.

In pursuance of my invention the inner end of the inlet port is preferably flattened or elongated, as at 17, without reducing the area of the inlet passage, thereby localizing the normal pressure of the fluid on the opposing surface of the valve body during the closing or the opening of the valve, and also presenting in conjunction with the lower surface of the valve, during such movement, a horizontal rectangular port.

The valve body is shaped to provide an upper chamber 18 within which the lower end of the spring 11 is seated, and the upper edge of the body is recessed, as at 19, for a sealing gasket 20 which slidably bears against the opposing inner wall of the casing. The gasket 20 is held in place by means of a clamp ring 21 which is secured to the valve body by suitably-disposed bolts 22. The floor of the chamber 18 has an upstanding internally-threaded neck 23 which is encircled by the lower end of the spring 11, the interior of such neck communicating at its lower end with a port or ports 24 extending through the bottom of the valve body 10. The lower end of the valve body has therein a circular recess, as at 25, which receives the tiltable disc 12. This disc has fitted in its under face a sealing gasket 26 adapted to co-act with the valve seat 7 when the piston valve is closed, and the top of the disc has formed therein a central concave socket 27 adapted to a complementary joint portion 28 formed on the valve body. Such body and the disc are flexibly connected by means of a screw pin 29 which extends loosely through an enlarged central opening in the joint portion 28 and is screwed into the disc, a suitable spring 30 being arranged to bear against the head of the pin and exert upward pressure thereon. The relative dimensions of the recess 25 and the disc 12 are such as to permit limited tilting of the disc while affording between the adjacent surfaces of the disc and the wall of the recess 25 a passage or passages, as 31, leading from the lower end of the valve body to the port or ports 24. Thus provision is had for the efficient seating of the valve as well as the passage of pressure from below the valve body to the interior of the casing above such body.

In order nicely to regulate the escape of the pressure from the neck 23 to the space above the valve 10 a suitable valve is provided which, in the present instance, comprises a hollow body 32 having a lower portion 33 which is screwed into the neck. The hollow interior of the body 32 terminates in a smaller passage 34 having lateral exit ports 35. A ball valve 36 is yieldingly supported in unseated relation to the mouth of the passage 34 by means of a suitable supporting spring 37 which is mounted within the body 32, the proximity of the ball to the passage 34 being regulated and determined by means of a vertical set screw 38 fitted in the top of the body. A light spring 39 interposed between the body and the head of the screw facilitates the adjusting operation.

From the foregoing described construction it will be seen that by actuation of the hand lever 16 the piston valve is lifted and held in raised position against the force of the spring, thus permitting the flow of liquid under pressure from the pipe line to and through the discharge pipe. When the lever is subsequently released the action of the compressed spring forces the piston valve downward to cut off the flow of liquid in the pipe line sufficiently to effect the slowing down of the pump and thereby prevent the building up of an excessive pressure in the line before the valve reaches its seat, thus preventing hammering in the pipe line, as previously mentioned. In other words, when the lever 16 is released the spring depresses the piston valve so as gradually to cut off the flow of the liquid under pressure until the inlet is closed, but since the valve seat is below the inlet as hereinbefore explained the further action of the spring is ineffective until fluid pressure equal to that below the piston valve passes to the chamber above such valve, whereupon the spring immediately urges the valve to its sealing position on the valve seat. The gasket bearing disc 12 flexibly supported at the bottom of the piston valve ensures an efficient sealing contact between the gasket 20 and the valve seat. The equalizing pressure for the piston valve is effected as follows: When the valve in its downward movement has travelled past the inlet port 17 the full pressure in the pipe line, being against the opposing side of the valve, holds the valve somewhat above its seat, since the spring is not strong enough to seat the valve in opposition to the resulting friction. However, the fluid pressure below the piston valve works through the space between the sealing disc 12 and the valve body, thence up through the ports 24 and past the connecting pin 29 thence past the regulating ball valve into the passage 34, thence escaping through the ports 35 of the body 32 into the chamber above the piston valve.

By suitably manipulating the set screw 38 the space between the resiliently supported ball valve 36 and the mouth of the axial passage 34 of the body 32 can be nicely regulated to insure the requisite flow of the fluid to the upper chamber, which space is adjustable in accordance with the effective working pressure in the pipe line in order that the piston valve shall close at a determined speed to prevent "hammer" or built up pressure in the pipe line. The regulating ball valve 36 also acts as a relief valve for the fluid pressure above the piston valve during the opening of the latter valve, that is to say, when the piston valve is opened by actuation of the lever the pressure in the upper chamber flows through the ports and passage to and past the ball valve, thence through the passages and ports leading to the bottom of the valve, thus eliminating fluid pressure in the upper chamber of the valve casing and utilizing only the force of the spring in the subsequent downward movement of the piston valve to cut-off the supply of liquid from the supply pipe to the discharge pipe, as previously described. The regulating ball valve 36, being supported by a very light compressible spring 37, readily adapts itself to variable downward pressure and so allows free discharge of the liquid from the upper chamber during the lifting of the piston valve.

It is to be understood that my invention is not limited to the specific structure herein disclosed, as the structure may be modified within the principle of the invention and the scope of the appended claims.

I claim—

1. A self-closing valve comprising a casing closed at one end and having a lateral inlet for fluid under pressure and also having an annular valve seat spaced beyond said inlet, a piston valve slidably fitted within said casing to open or close the inlet and also to afford a pressure chamber in the closed end of the casing, said piston valve including a body having a peripheral surface which fully closes the inlet in opposition to the pressure and friction of the excluded fluid before the valve has been seated, and having also a passage extending longitudinally therethrough and non-communicating with the fluid inlet when such inlet is closed by the valve body, a regulating valve in unsealed relation to the said passage to control the flow of pressure into and from said chamber, a spring normally urging the piston valve across the inlet and toward said valve seat, and actuating means for moving said piston valve to opening position against the action of the spring, the force of said spring being sufficient to move the piston valve to inlet closing position but not to seating position, and the added pressure against the end of the valve remote from the valve seat of the confined fluid within the pressure chamber thereupon overcoming the opposing pressure and friction of the excluded fluid on the surface of the valve, thus effecting the seating of the valve after the closing of the inlet.

2. A self-closing valve comprising a casing closed at one end and having a lateral inlet for fluid under pressure and also having an annular valve seat spaced beyond said inlet, the inner end of the inlet being flattened to provide an elongated port, a piston valve slidably fitted within said casing to open or close the inlet and also to afford a pressure chamber in the closed end of the casing, said piston valve including a body having a peripheral surface which fully closes the elongated port in opposition to the pressure and friction of the excluded fluid before the valve has been seated, and having also a passage extending therethrough and non-communicating with the fluid inlet when such inlet is closed by the valve body, a regulating valve in unsealed relation to the said passage to control the flow of pressure into and from said chamber, a spring normally urging the piston valve across the inlet and toward said valve seat, and actuating means for moving said piston valve to opening position against the action of the spring, the force of said spring being sufficient to move the piston valve to inlet closing position but not to seating position, and the added pressure against the end of the valve remote from the valve seat of the confined fluid within the pressure chamber thereupon overcoming the opposing pressure and friction of the excluded fluid on the surface of the valve, thus effecting the seating of the valve after the closing of the inlet.

3. A self-closing valve comprising a casing closed at one end and having a lateral inlet for fluid under pressure and also having an annular valve seat spaced beyond said inlet, a piston valve slidably fitted within said casing to open or close the inlet and also to afford a pressure chamber in the closed end of the casing, said piston valve including a body having a peripheral surface which fully closes the inlet in opposition to the pressure and friction of the excluded fluid before the valve has been seated, and having also a passage extending longitudinally therethrough and non-communicating with the fluid inlet when such inlet is closed by the valve body, a regulating valve in unsealed relation to the said passage to control the flow of pressure into and from said chamber, said valve comprising a ball resiliently supported in open position and means for adjusting the ball to vary its opening relation to the passage, a spring normally urging the piston valve across the inlet and toward said valve seat, and actuating means for moving said piston valve to opening position against the action of the spring, the force of said spring being sufficient to move the piston valve to inlet closing position but not to seating position, and the added pressure against the end of the valve remote from the valve seat of the confined fluid within the pressure chamber thereupon overcoming the opposing pressure and friction of the excluded fluid on the surface of the valve, thus effecting the seating of the valve after the closing of the inlet.

4. A self-closing valve comprising a casing closed at one end and having a lateral inlet for fluid under pressure and having also an annular valve seat spaced beyond said inlet, a piston valve reciprocative in said casing to close or open the inlet, said piston valve including a body having a passage extending longitudinally therethrough and a gasket-supporting member flexibly connected to the end of the body proximate to the valve seat and providing a space in communication with the longitudinal passage of the valve body, a regulating valve for the end of said passage remote from the valve seat, a spring normally urging the piston valve across the inlet and toward said valve seat, and actuating means for moving said piston valve to opening position against the action of the spring.

5. A self-closing valve comprising a casing closed at one end and having a lateral inlet for fluid under pressure and having also an annular valve seat spaced beyond said inlet, a piston valve reciprocative in said casing to close or open the inlet, said piston valve including a body having a passage extending longitudinally therethrough and a gasket-supporting member flexibly connected to the end of the body proximate to the valve seat and providing a space in communication with the longitudinal passage of the valve body, a regulating valve for the end of said passage remote from the valve seat, said latter valve comprising a ball resiliently supported in open position and means for adjusting said ball to vary its opening relation to the passage, a spring normally urging the piston valve across the inlet and toward said valve seat, and actuating means for moving said piston valve to opening position against the action of the spring.

6. A self-closing valve comprising a casing closed at one end and having a lateral inlet for fluid under pressure and having also an annular valve seat spaced beyond said inlet, a piston valve slidably fitted within said casing to open or close the inlet, said piston valve including a body having a peripheral surface which fully closes the inlet in opposition to the pressure and friction of the excluded fluid before the valve is seated, a passage extending longitudinally through the valve body and non-communicating with the fluid inlet when such inlet is closed and a recess in the end of the body proximate to the valve seat, a gasket-supporting member loosely mounted in the recess of said body to afford between the said member and the walls of the recess a space in communication with the longitudinal passage of the valve body, a regulating valve for the end of said passage remote from the valve seat, a spring normally urging the piston valve across the inlet and toward said valve seat, and actuating means for moving said piston valve to opening position against the action of the spring.

7. A self-closing valve comprising a casing closed at one end and having a lateral inlet for fluid under pressure and having also an annular valve seat spaced beyond said inlet, a piston valve slidably fitted within said casing to open or close the inlet, said piston valve including a body having a peripheral surface which fully closes the inlet in opposition to the pressure and friction of the excluded fluid before the valve is seated, a passage extending longitudinally through the valve body and non-communicating with the fluid inlet when such inlet is closed and a recess in the end of the body proximate to the valve seat, a gasket-supporting member loosely mounted in the recess of said body to afford between the said member and the walls of the recess a space in communication with the longitudinal passage of the valve body, a regulating valve for the end of said passage remote from the valve seat, said latter valve comprising a ball resiliently supported in open position and means for adjusting said ball to vary its opening relation to the passage, a spring normally urging the piston valve across the inlet and toward said valve seat, and actuating means for moving said piston valve to opening position against the action of the spring.

PETER HERRMANN.